(12) United States Patent
Atmur

(10) Patent No.: US 7,453,257 B1
(45) Date of Patent: Nov. 18, 2008

(54) SYSTEM AND METHOD FOR PRECISION CURRENT SOURCE

(75) Inventor: Robert Atmur, Whittier, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/969,736

(22) Filed: Jan. 4, 2008

(51) Int. Cl.
*G01R 33/00* (2006.01)

(52) U.S. Cl. .................................. 324/117 R; 324/126

(58) Field of Classification Search ........................ None
See application file for complete search history.

(56) References Cited

U.S. PATENT DOCUMENTS 4,021,729 A * 5/1977 Hudson, Jr. ................. 324/509

* cited by examiner

*Primary Examiner*—Minh N Tang
(74) *Attorney, Agent, or Firm*—MacPherson Kwok Chen & Heid, LLP.; Jeffrey A. Hopkins

(57) ABSTRACT

Systems and methods of the present disclosure, in accordance with one or more embodiments, include a current source adapted to provides volts*sec at a fixed frequency, a magnetic core adapted to be saturated with energy, and a control winding around the magnetic core. The control winding is adapted to receive current from the current source to saturate the magnetic core. A control circuit is adapted to selectively provide additional volt*sec for at least one half of a cycle of the fixed frequency to the control winding. A second winding around the magnetic core provides a load current to a load through desaturation of energy stored in the magnetic core.

21 Claims, 4 Drawing Sheets

SYSTEM AND METHOD FOR PRECISION CURRENT SOURCE

TECHNICAL FIELD

The present disclosure relates generally to electrical circuits and, more particularly, to precision current sources.

BACKGROUND

In general, space power applications require stringent performance characteristics for harsh environmental conditions including radiation hardening performance and high stability performance over extended periods, which should be independent of load drift and step changes due to environmental effects. In particular, there is a need for a current source that is capable of providing an accurate and stable current through high-bit resolution (e.g., 22-bit resolution) under a constant temperature environment (e.g., +/−0.1° C.).

Current conventional space power applications offer no known solution that provides a high level of performance under a changing load. Some conventional power applications use semiconductor devices in ways that directly affect the stability of current in these devices, which often forces radiation impacts of less than 10 ppm. Typically, the bandwidth of these devices does not meet system requirements, and in some instances, drift rates are at or near the allowable limits. With conventional power applications, there is no means of compensating for these deficiencies.

As a result, there exists a need to provide a stable current that meets requirements listed above under load drift and radiation conditions.

SUMMARY

Systems and methods disclosed herein, in accordance with one or more embodiments, provide a stable and precise current source that is less susceptible to the affects of component drift and high energy radiation particles by selectively saturating a magnetic core (e.g., input volt*sec) on a pulse-by-pulse basis to provide a net current that is controllable to a precision dependent on the ratio of the differences in volt*sec applications. In one implementation, a stable current source is provided by selectively applying a current to a control winding to saturate a magnetic core. Control logic is used for fine or coarse current control. A load on a second winding about the magnetic core is presented with a stable current source through desaturation of energy in the magnetic core.

Systems and methods disclosed herein, in accordance with one or more embodiments, provide innovative characteristics including controlled application of fine and coarse current through inductor windings about a magnetic core to maintain a stable and precise current. In one implementation, a first current source provides volt*sec at a fixed frequency for coarse current supply, and a separate second current source providing volt*sec at a fixed frequency for fine current supply. A stable current source includes a saturable magnetic core and a control winding around the magnetic core. The control winding is capable of receiving an applied current from the first current source and/or the second current source such that the magnetic core may be saturated within a predetermined current range (e.g., system usable and/or predefined inductance values). A secondary winding around the magnetic core is adapted to provide a current source through desaturation of the energy stored in the magnetic core. A current control circuit is adapted to selectively switch between the first current source and second current source to provide additional volt*sec for at least one half of the primary cycle. The current control circuit includes a coarse current controller and/or a fine current controller.

In accordance with one embodiment, a system includes a current source for providing volts*sec at a fixed frequency, a magnetic core adapted to be saturated with energy, and a control winding around the magnetic core. The control winding is adapted to receive current from the current source to saturate the magnetic core. A control circuit is adapted to selectively provide additional volt*sec for at least one half of a cycle of the fixed frequency to the control winding. A second winding around the magnetic core is adapted to provide a load current to a load through desaturation of energy stored in the magnetic core.

In accordance with another embodiment, a method includes providing volts*sec at a fixed frequency, saturating a magnetic core with energy by applying current to a control winding around the magnetic core, selectively providing additional volt*sec for at least one half of a cycle of the fixed frequency to the control winding, and providing a load current to a load through desaturation of energy stored in the magnetic core from a second winding around the magnetic core.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. It should be appreciated that like reference numerals are used to identify like elements illustrated in one or more of the figures.

DETAILED DESCRIPTION

Systems and methods disclosed herein, in accordance with one or more embodiments, provide precise power regulation for harsh environmental applications, such as space vehicle applications, where precision current is needed for inertial navigation and where high radiation (e.g., nuclear environment) may be a concern (e.g., use of magnetic core vs. typical power regulation to reduce radiation susceptibility). For example, some strategic inertial instruments, such as gyros and accelerometers, should have a highly stable current source to provide good estimates of angular rate and acceleration during missile flight (e.g., guidance missile applications).

Systems and methods disclosed herein, in accordance with one or more embodiments, provide a precise current source to a load by selectively applying current to one or more control windings to saturate a magnetic core of a magnetic component. Control logic is used for fine or coarse current control. A load on a second winding about the magnetic core is presented with a precise current source through desaturation of the energy in magnetic core.

Figure 1:
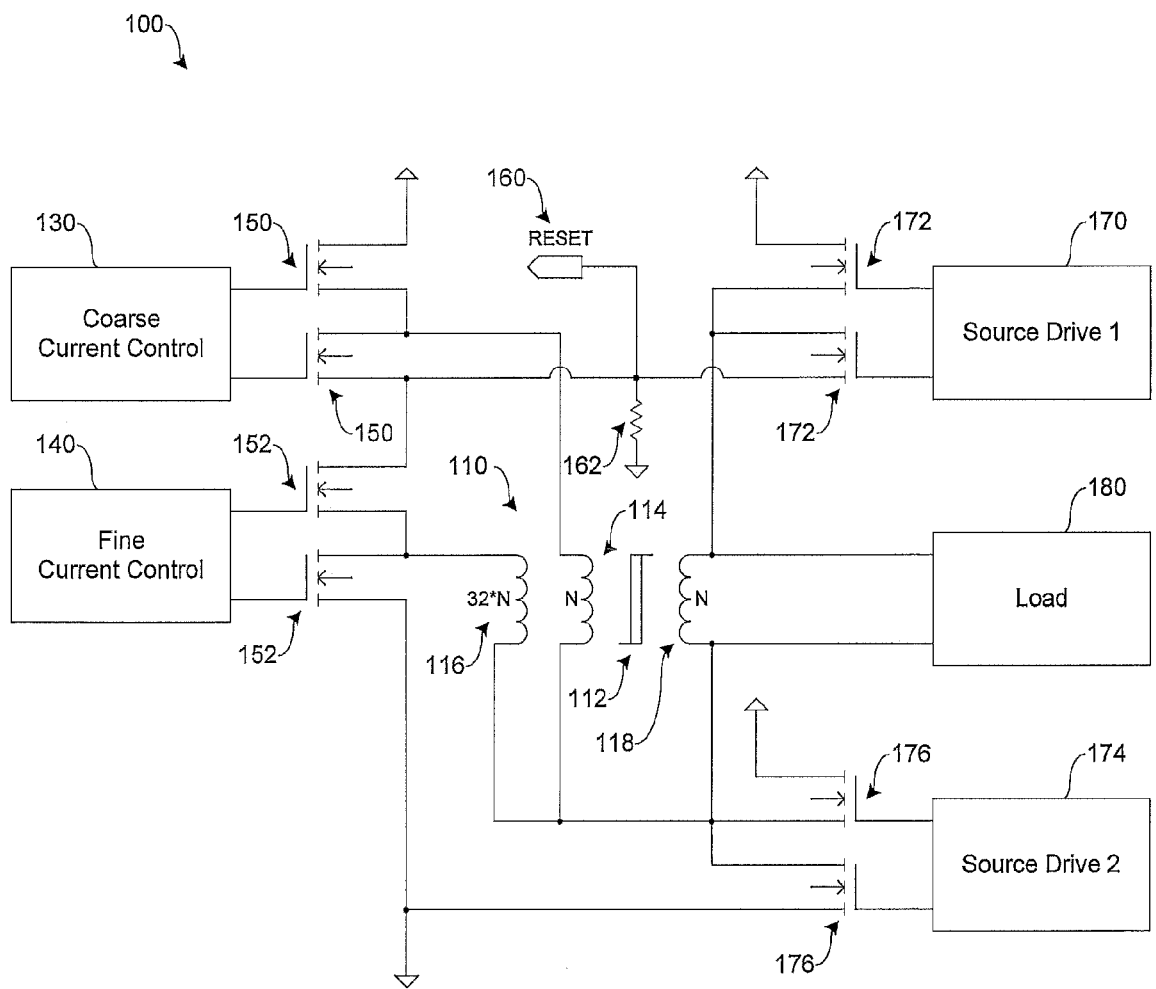
FIG. 1 shows a block diagram of a system comprising a magnetic amplifier based current source in accordance with an embodiment of the present disclosure.

FIG. 1 shows one embodiment of a system 100 comprising a magnetic amplifier (MAGAMP) based precision current source that provides a stepped volt*sec source. In general, the unit of volt*sec is a measurement of magnetic flux. As such, the volt*sec unit of magnetic flux may be equated to the flux that produces, in a circuit of one turn, an EMF (electromotive force) of one volt, when the flux is reduced to zero within one second.

Conventionally, magnetic amplifier (i.e., MAGAMP) applications are used in power supply systems and not for instrumentation. In contrast to conventional applications, embodiments of systems and methods disclosed herein provide a MAGAMP application for instrumentation, such as the precision current source of the present disclosure.

The system 100 includes a magnetic component 110, a coarse current control component 130, a fine current control component 140, a plurality of transistors 150, 152, a reset component 160 and a plurality of source drive components 170, 174. The magnetic component 110 includes a magnetic core 112, a coarse control primary winding 114, a fine control primary winding 116 and a secondary winding 118. The magnetic core 112 is capable of being saturated with energy. The coarse control primary winding 114 around the magnetic core 112 is capable of receiving an applied current from one or more sources including the coarse current control component 130 such that the magnetic core 112 may be saturated within a predetermined current range. The secondary winding 118 around the magnetic core 112 provides a stable current source to the load 180 through desaturation of energy stored in the magnetic core 112.

In one implementation, the saturable magnetic core 112 has two primary windings 114, 116 with initial inductance values that cause saturation of the magnetic core 112 within, for example, a system usable current range. Load 180 (e.g., instrument) is placed in series with the secondary winding 118 with a large valued inductance stabilizing inductor. The coarse control primary winding 114 is continuously energized with the coarse current control component 130 via transistors 150, which yields a source of volt*sec that is self-regulated to a value on the output controlled by the saturation of the magnetic core. The fine control primary winding 116 is selectively energized with the fine current control component 140 via transistors 152, 152, which yields an additive source of volt*sec to the volt*sec provided by the coarse current control component 130 to the coarse control primary winding 114.

Current generated by the system 100 to the load 180 is independent (e.g., over a small range +/−5 V) of the applied voltage. The magnetic material of the magnetic component 110 may have no measurable aging or drift with time. Constant power in the control device is independent of the commanded current in the load, and the control element is relatively immune to radiation at the levels above system requirements. In one embodiment, the magnetic core 112 comprises iron, which is relatively unaffected by radiation, including high energy particles and/or waves, such as gamma rays.

In one implementation, tape or stripe wound (TWR) cores may be used for the magnetic core 112 of the magnetic component 110. For stability and/or repeatability performance, TWR cores are high mu devices with no magnetic gap magnetic properties and may have moderate thermal stability ~1% over a 250 degree C. change. There is relatively low measurable aging (e.g., approximately 20 years) due to the manufacturing techniques (e.g., epoxy encapsulation). There are small magneto-striction effects. In some instances, TWR cores are relatively high mu devices with no magnetic gap and are magnetically square. TWR cores provide a sharp transition into material saturation and provide a rapid change in source impedance, which is good for MAGAMP applications. TWR cores offer many orders of magnitude change possible in source impedance with a max frequency of approximately ~150 kHz.

The source drive components 170, 174 provide a constant pulse current source to the magnetic component 110 via transistors 172, 176, respectively. In various implementations, the source drive components 170, 174 provide volt*sec at a fixed frequency for constant current supply to the magnetic component 110. This constant current supply to the magnetic component 110 at a fixed frequency may be adjusted with the coarse current control component 130 and fine current control component 140.

The coarse current control component 130 provides, in one embodiment, a selectively additive pulse current source for coarse adjustment of current applied to the coarse control primary winding 114 of the magnetic component 110. In one implementation, the coarse current source 130 provides volt*sec at a fixed frequency for coarse current supply to the coarse control primary winding 114 of the magnetic component 110. In various implementations, the coarse control primary winding 114 may have any number of windings (N) as practical for use with the system 100. The plurality of transistors 150 allow current to flow from the coarse current control component 130 to the coarse control primary winding 114 of the magnetic component 110.

The fine current control component 140 provides, in one embodiment, a selectively additive pulse current source for fine adjustment of current applied to the fine control primary winding 116 of the magnetic component 110. In one implementation, the fine current control component 140 provides volt*sec at a fixed frequency for fine current supply to the fine control primary winding 116 of the magnetic component 110. In various implementations, the fine control primary winding 116 may have a multiple of any number of windings (M*N) as practical for use with the system 100. In one example, the fine control primary winding 116 has 32 times (i.e., M=32) the number of windings (32*N) of the coarse control primary winding 114. In one aspect, the plurality of transistors 152 allow current to flow from the fine current control component 140 to the fine control primary winding 116 of the magnetic component 110.

The reset component 160 works in combination with resistor 162 to provide a signal to the control logic as to when the magnetic core 112 saturates. In one implementation, the voltage across the resistor rises rapidly when the magnetic core 112 saturates.

Figure 2:
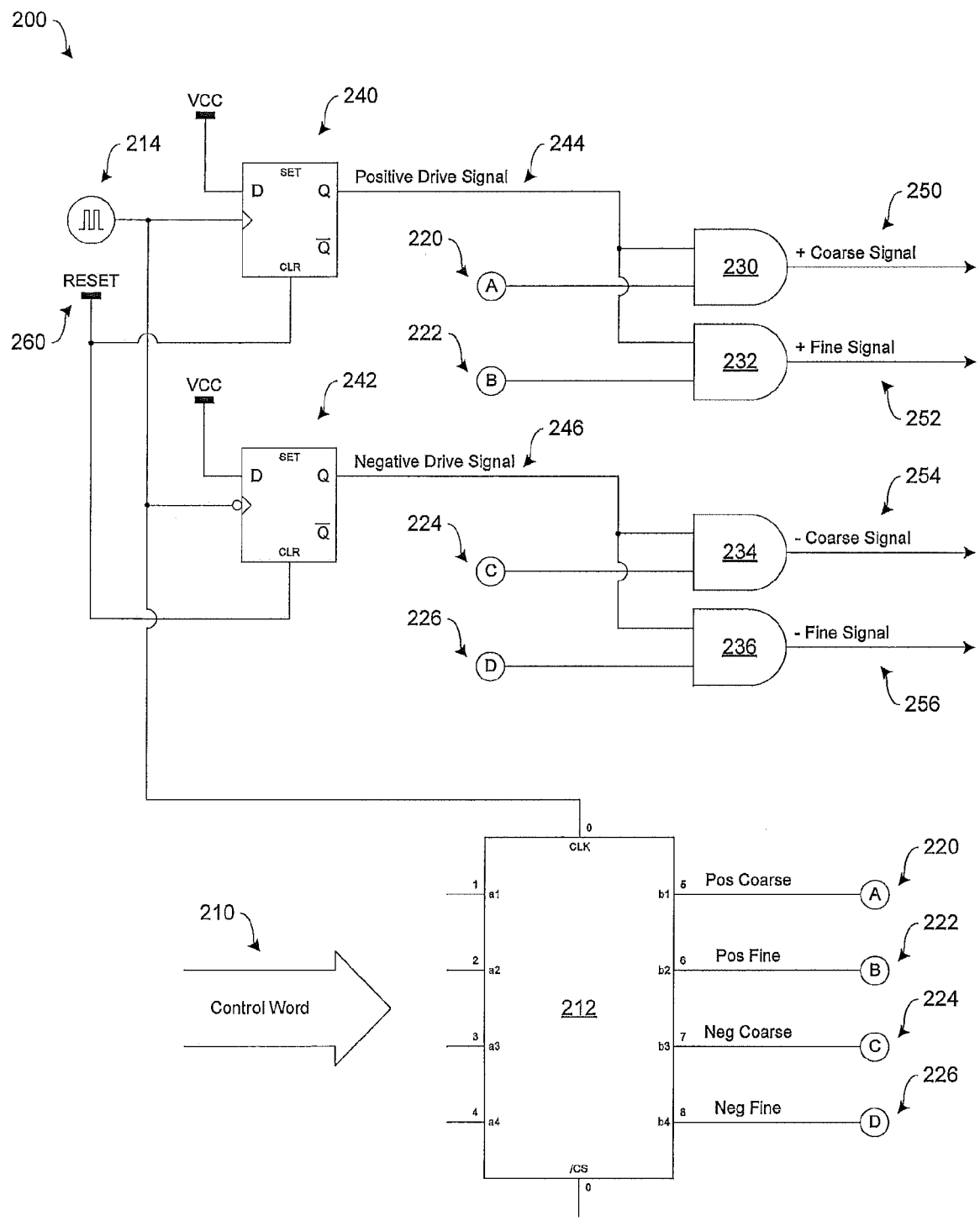
FIG. 2 shows a block diagram of a control circuit for selectively switching between current sources in accordance with an embodiment of the present disclosure.

FIG. 2 shows one embodiment of a control circuit 200 for selectively switching between a coarse current source and a fine current source to provide additional volt*sec for at least one half of the primary cycle to the first control winding. In one implementation, the control circuit 200 provides source signals for the coarse current control component 130 and fine current control component 140 of the system 100 of FIG. 1. In one implementation, the control circuit 200 selectively switches between the coarse current source and/or the fine current source to provide additional volt*sec for at least one half of the primary cycle of the fixed frequency of the source drives 170, 172 of FIG. 1.

Referring to FIG. 2, a control word 210 from a processing device (not shown), such as a computer terminal, is provided to a controller 212. The controller 212 provides a positive coarse signal 220, a positive fine signal 222, a negative coarse signal 224 and a negative fine signal 226 to inputs of logic gates 230, 232, 234, 236 (e.g., logic gates may comprise AND gates, as shown in FIG. 2). A plurality of D flip-flops 240, 242 provide a positive drive signal 244 and a negative drive signal 246 to the other inputs of the logic gates 230, 232, 234, 236. An oscillator 214 provides a clock signal (e.g. clocked frequency of 100 kHz) to the controller 212 and the D flip-flops 240, 242. The outputs of the logic gates 230, 232, 234, 236 provide positive and negative coarse control signals 250, 252 and positive and negative fine control signals 254, 256 as outputs from the coarse current control component 130 and fine current control component 140, respectively, of the system 100 of FIG. 1. In one implementation, a reset signal 260 provided by reset component 160 of system 100 of FIG. 1 is used to reset (i.e., clear) D flip flops 240, 242 when the magnetic component 110 of system 100 of FIG. 1 saturates.

Figure 3:
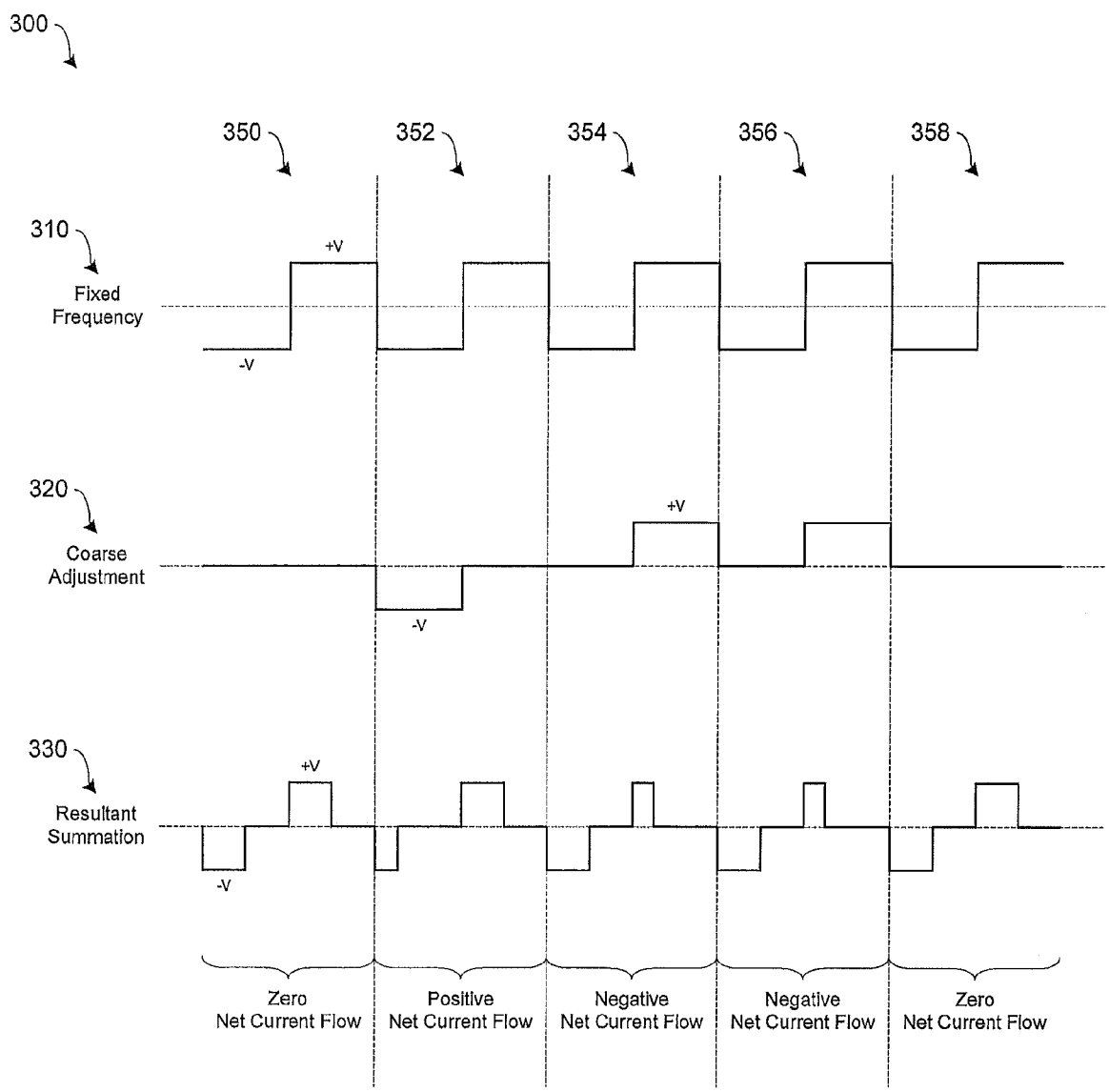
FIG. 3 shows a block diagram of waveforms provided to a load in accordance with an embodiment of the present disclosure.

FIG. 3 shows various embodiments of volt*sec waveforms 300 provided to the load 180 by system 100 of FIG. 1. In one implementation, as shown in FIG. 3, the waveforms 300 may comprise a plurality of cycles 350, 352, 354, 356, 358.

A first waveform 310 represents, in one embodiment, a fixed frequency waveform provided by source drives 172, 174 to magnetic component 110. In one implementation, the first waveform 310 comprises a repeating square pulse waveform having a negative voltage component and a positive voltage component for each cycle 350, 352, 354, 356, 358.

A second waveform 320 represents, in one embodiment, the coarse adjustment waveform provided by the coarse current source component 130 to the magnetic component 110. In one implementation, the second waveform 320 comprises various waveforms having zero voltage components (as shown by example in cycles 350, 358), a negative voltage component (as shown by example in cycle 352), and/or a positive voltage component (as shown by example in cycles 354, 356). It should be appreciated that the coarse adjustment waveform may comprise a fine adjustment waveform provided by the fine current source component 140 to the magnetic component 110.

A third waveform 330 represents, in one embodiment, a resultant summation waveform provided by adding the fixed frequency waveform 310 to the coarse adjustment waveform 320 to produce a net current flow to the load 180 of system 100 of FIG. 1. In one implementation, the third waveform 330 comprises various waveforms having zero net current flow (as shown by example in cycles 350, 358), a negative net current flow (as shown by example in cycle 352), and/or a positive net current flow (as shown by example in cycles 354, 356).

In various implementations, for current generation and control, the system 100 is driven fully saturated in each direction in each cycle. The volts*sec applied to the load 180 (e.g., instrument) is not the only source of volt*sec to the system 100. In one example, the volt*sec is stepped by providing additional volt*sec to the system 100 to one half of the primary cycle. An imbalance in the volt*sec applied to the load yields a charge pulse that, when integrated over time, yields a precision current.

Moreover, the saturating magnetic component 110 modifies the volt*sec applied across the load 180. By selectively controlling the input volt*sec saturation on a pulse-by-pulse basis, a net volt*sec difference may be applied to the load 180. This delta in volt*sec across the inductive load 180 produces a net current that is selectively controllable to a precise numerical factor that is dependent on the ratio of the differences in applied volt*sec. This feature allows for high precision beyond what is conventionally available.

Systems and methods disclosed herein, in accordance with one or more embodiments, provide a controlled current by allowing the intrinsic saturation and recovery of volt*sec applied to the device. Systems and methods disclosed herein, in accordance with one or more embodiments, provide a saturating magnetic component to create a precisely controllable volt*sec current source. A series regulating component allows removal of semiconductors from the current path, and current generated is independent (e.g., over a small range +/−5 V) of applied voltage. As such, in one aspect, the magnetic core material is adapted to have no measurable aging or drift with time, constant power in the control device is independent of the commanded current in the load, and the control element is relatively immune to radiation at levels above system requirements.

Systems and methods disclosed herein, in accordance with one or more embodiments, produce a stable current source immune to important environmental concerns, such as drift and radiation. In various implementations, structural components may include metal-oxide-semiconductor-field-effect-transistors (i.e., MOSFETs), magnetic elements, and/or drive logic. In various implementations, under non-saturated conditions the volt*sec transferable across the drive element is >40 times what is required to compensate for the volt*sec loss across the load element. As current builds in the circuit (e.g., stabilizing inductor), the core of the saturating element provides less and less volt*sec to the load and the stabilizing inductor until saturation. As volt*sec are lost in the circuit (e.g., time passes), the core falls out of saturation to be driven back at a rate (e.g., frequency) high enough to limit the droop in current below the 0.25 ppm allowance.

Figure 4:
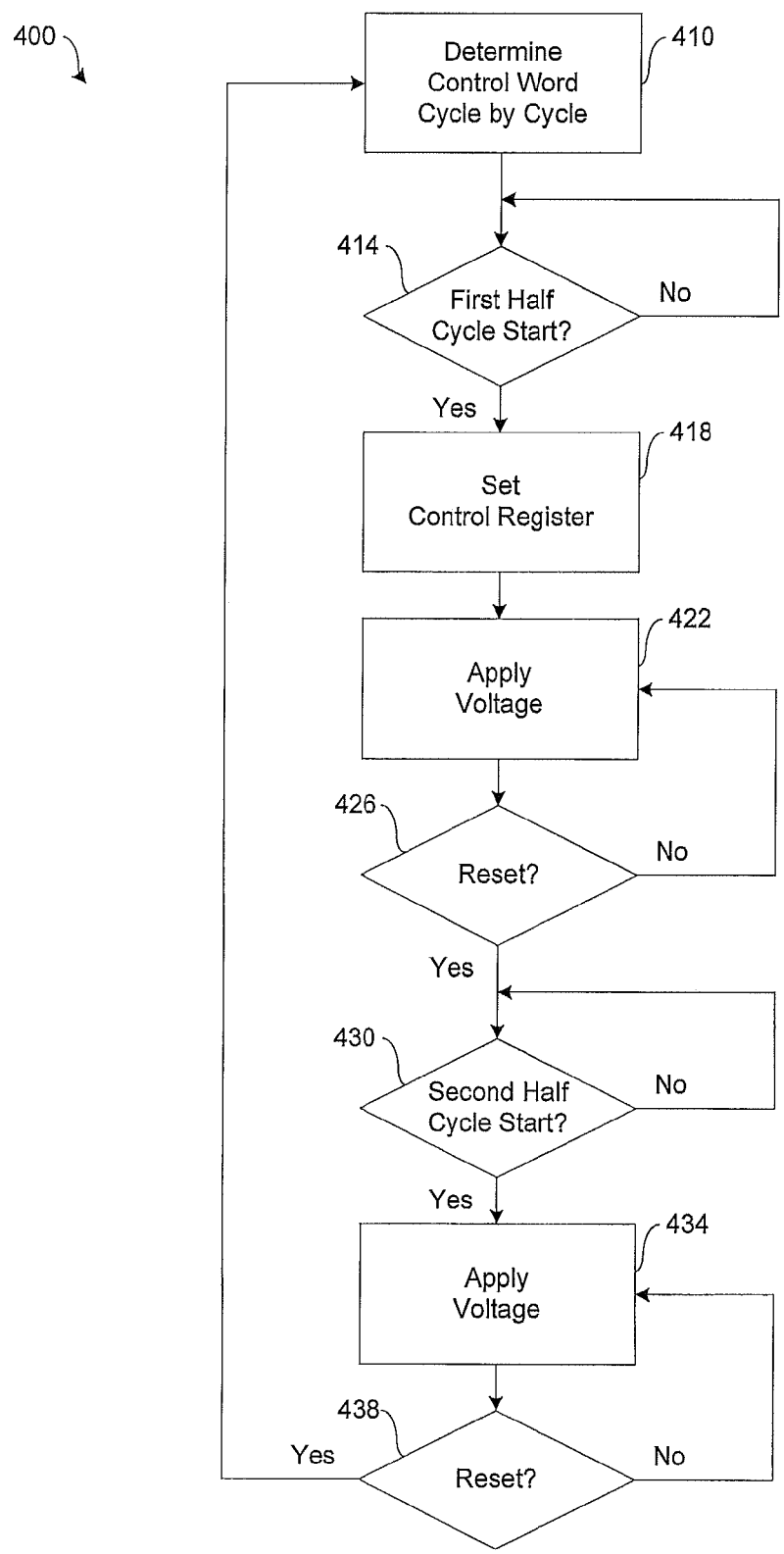
FIG. 4 shows a block diagram of a method for generating and controlling waveforms provided to a load in accordance with an embodiment of the present disclosure.

FIG. 4 shows one embodiment of a method 400 for generating and controlling cycles of volt*sec waveforms provided to the load 180 by system 100 of FIG. 1. Reference may be made to the various embodiments and descriptions of FIGS. 2 and 3.

As shown in FIG. 4, a control word is determined cycle by cycle (block 410). As previously described in reference to FIG. 2, the control word 210 may be provided by a processing device (not shown), such as a computer terminal, to the controller 212.

Next, a determination is made as to start the first half cycle of a volt*sec waveform (block 414). If no to start to first half cycle, then the action is repeated until a time to start the first half cycle of the volt*sec waveform. If yes to start, then method 400 proceeds.

Next, a control register is set (block 418). In one implementation, the control register is a four bit block that comprises the control word for setting up (i.e., configuring) the operation of the flip-flops as shown in FIG. 2.

Next, one or more voltages are applied (block 422). In various implementations, primary and control voltages are applied to the MAGAMP system 100 for waveform generation and control of first cycle. In one example, the voltage is applied to the primary winding and to the control coils either course or fine depending on the state of the control word in the control register.

Next, a determination is made as to reset the system 100 (block 426). If no to reset, then the one or more voltages remain applied for the entire first half cycle (block 422). If yes to reset, then method 400 proceeds.

Next, a determination is made as to start the second half cycle of a volt*sec waveform (block 430). If no to start to second half cycle, then the action is repeated until a time to start the second half cycle of the volt*sec waveform. If yes to start, then method 400 proceeds.

Next, one or more voltages are applied (block 434). In various implementations, primary and control voltages are applied to the MAGAMP system 100 for waveform generation and control of second cycle.

Next, a determination is made as to reset the system 100 (block 438). If no reset, then the one or more voltages are applied again for second half cycle (block 434). If yes to reset, then method 400 returns to determine the control word cycle by cycle (block 410).

Embodiments described above illustrate but do not limit the disclosure. It should also be understood that numerous modifications and variations are possible in accordance with the principles of the present disclosure. Accordingly, the scope of the disclosure is defined only by the following claims.

The invention claimed is:

1. A system comprising:
 a current source providing volts*sec at a fixed frequency;
 a magnetic core adapted to be saturated with energy;
 a control winding around the magnetic core, the control winding adapted to receive current from the current source to saturate the magnetic core;
 a control circuit for selectively providing additional volt*sec for at least one half of a cycle of the fixed frequency to the control winding; and
 a second winding around the magnetic core for providing a load current to a load through desaturation of energy stored in the magnetic core.

2. The system of claim 1, wherein the control winding comprises a plurality of control windings with initial inductance values that cause saturation of the magnetic core within a usable current range, and wherein the control windings include a coarse control winding and a fine control winding.

3. The system of claim 2, wherein the coarse control winding around the magnetic core is capable of receiving an applied current from at least the control circuit to saturate the magnetic core within a predetermined current range.

4. The system of claim 2, wherein the control circuit includes a coarse current control component, and wherein the coarse control winding is continuously energized with the coarse current control component, which yields a source of volt*sec that is self-regulated to a value on the output controlled by the saturation of the magnetic core.

5. The system of claim 4, wherein the control circuit includes a fine current control component, and wherein the fine control winding is selectively energized with the fine current control component, which yields an additive source of volt*sec to the volt*sec provided by the coarse current control component to the coarse control winding.

6. The system of claim 4, wherein the coarse current control component provides a selectively additive pulse current source for coarse adjustment of current applied by the current source.

7. The system of claim 5, wherein the fine current control component provides a selectively additive pulse current source for fine adjustment of current applied by the current source.

8. The system of claim 1, wherein the magnetic core comprises iron.

9. The system of claim 1, wherein the magnetic core comprises a tape wound (TWR) core.

10. The system of claim 1, wherein the current source includes a plurality of source drive components that provide a constant pulse current source to the magnetic core, and wherein the source drive components provide volts*sec at a fixed frequency for constant current supply to the magnetic core.

11. The system of claim 1, further comprising a reset component that provides a signal to the control circuit as to when the magnetic core saturates.

12. A method comprising:
 providing volts*sec at a fixed frequency;
 saturating a magnetic core with energy by applying current to a control winding around the magnetic core;
 selectively providing additional volt*sec for at least one half of a cycle of the fixed frequency to the control winding; and
 providing a load current to a load through desaturation of energy stored in the magnetic core from a second winding around the magnetic core.

13. The method of claim 12, wherein the control winding comprises a plurality of control windings with initial inductance values that cause saturation of the magnetic core within a usable current range, and wherein the control windings include a coarse control winding and a fine control winding.

14. The method of claim 13, wherein the coarse control winding around the magnetic core is capable of receiving the applied current to saturate the magnetic core within a predetermined current range.

15. The method of claim 13, further comprising continuously energizing the coarse control winding to yield a source of volt*sec that is self-regulated to a value on the output controlled by the saturation of the magnetic core.

16. The method of claim 15, further comprising selectively energizing the fine control winding to yield an additive source of volt*sec to the volt*sec provided by the coarse control winding.

17. The method of claim 12, wherein the magnetic core comprises iron.

18. The method of claim 12, wherein the magnetic core comprises a tape wound (TWR) core.

19. The method of claim 12, wherein providing volts*sec at a fixed frequency comprises providing a constant pulse current source to the magnetic core.

20. The system of claim 12, further comprising determining when the magnetic core saturates.

21. A system comprising:
 means for providing volts*sec at a fixed frequency;
 means for saturating a magnetic core with energy by applying current to a control winding around the magnetic core;
 means for selectively providing additional volt*sec for at least one half of a cycle of the fixed frequency to the control winding; and
 means for providing a load current to a load through desaturation of energy stored in the magnetic core from a second winding around the magnetic core.

\* \* \* \* \*